US007295292B1

(12) United States Patent
Jumper et al.

(10) Patent No.: US 7,295,292 B1
(45) Date of Patent: Nov. 13, 2007

(54) METHODS AND SYSTEMS FOR MEASURING AN ABERATED WAVE FRONT

(75) Inventors: Eric Jumper, Granger, IN (US); Stanislav Gordeyev, Mishawaka, IN (US); Alan Cain, St. Louis, MO (US); Terry Ng, Sylvania, OH (US)

(73) Assignee: The University of Notre Dame, Notre Dame, IN (US)

( * ) Notice: Subject to any disclaimer, the term of this patent is extended or adjusted under 35 U.S.C. 154(b) by 250 days.

(21) Appl. No.: 11/132,312

(22) Filed: May 19, 2005

Related U.S. Application Data

(60) Provisional application No. 60/572,477, filed on May 20, 2004.

(51) Int. Cl.
*G01B 9/00* (2006.01)
*G01N 21/00* (2006.01)
*G01J 1/00* (2006.01)

(52) U.S. Cl. .................. 356/124; 356/121; 356/614; 356/73; 356/27; 73/1.16; 250/201.9; 250/201; 250/202

(58) Field of Classification Search ............... 356/121, 356/124, 614, 73, 27; 73/1.16; 250/201.9, 250/559.32, 201, 202
See application file for complete search history.

(56) References Cited

U.S. PATENT DOCUMENTS 6,429,415 B1 * 8/2002 Rhoads .................. 250/208.1
6,649,895 B1 * 11/2003 Wirth .......................... 356/121
6,784,408 B1 * 8/2004 Cheung et al. .......... 250/201.9
6,959,259 B2 * 10/2005 Vock et al. .................. 702/142

OTHER PUBLICATIONS

Malley, M., Sutton, G.W., and Kincheloe, N., "Beam Jitter Measurements for Turbulent Aero-Optical Path Differences," vol. 31, *Applied Optics*, pp. 4440-4443 (1992).

* cited by examiner

*Primary Examiner*—Gregory J. Toatley, Jr.
*Assistant Examiner*—Iyabo S Alli
(74) *Attorney, Agent, or Firm*—Jagtiani + Guttag

(57) ABSTRACT

Methods and systems are described for a system for measuring aberrations in a wave front. In the improved system multiple closely-spaced, small-aperture laser beams traverse an aberrating flow that introduces deflections of small-aperture laser beams from which aberrated wavefronts can be constructed. These beams may then be focused on position sensing devices using focusing lenses. The position sensing devices may then detect the positions of these beams and a difference between the detected position and the unaberrated position of the beams detected. This information may then be used to determine information regarding the optical aberrations introduced by the flow that may be used, for example, in improving communications systems and/or laser weapon systems.

33 Claims, 6 Drawing Sheets

METHODS AND SYSTEMS FOR MEASURING AN ABERATED WAVE FRONT

CROSS-REFERENCE TO RELATED APPLICATIONS

This application claims the benefit of U.S. provisional application No. 60/572,477, filed May 20, 2004, entitled "Malley Derivative Sensor and Probe," which is hereby incorporated by reference herein.

GOVERNMENT INTEREST STATEMENT

The United States Government owns rights in the present invention as research relevant to the development of the invention was supported by United States federal funds from the Air Force Office of Scientific Research, Contract/Grant Number F49620-02-C-0051.

BACKGROUND

1. Field of the Invention

The present invention relates generally to measurement systems, and more particularly, to methods and systems for measuring aberrations in a wave front.

2. Related Art

When an otherwise planar wave front of an optical signal, such as, for example, a laser beam, travels through a medium with a variable index of refraction, its wave front may become distorted. When the transmission distance through the medium is relatively small and the aberrations are caused by a flow with a changing density field, these optically aberrating effects are referred to as aero-optical effects. These optically aberrating effects often degrade the performance of optical systems using such optical signals. These optical systems may include, for example, weaponry related systems and optical free-space communications systems.

Aberrations of an optical wave front may be caused by the wave front passing through one or more variable-index turbulent flow fields. Such flow fields may originate in a mixing layer between two dissimilar-index flow streams (commonly referred to as "two-index mixing"). Or, aberrations of a wave front may result from the optical signal passing through separated flows, boundary layers, and free shear layers. The latter scenarios often occur when using lasers on flight vehicles traveling at high flight speeds (e.g., Mach numbers greater than 0.3).

The optically-aberrating effects of high-speed, turbulent boundary layers have been the subject of research since the early 1950's, which produced the first theoretical formulation for the optically-aberrating effects based on statistical measures of the turbulence. Work on turbulent boundary layers and separated shear layers intensified in the late 1960's and through the 1980's due to an interest in placing lasers on aircraft.

A Malley-Derivative Sensor, hereafter referred to as a Malley probe is an optical instrument that can make direct, accurate measurements of dynamically-distorting wave fronts, including the characteristics of the Optical Path Difference (OPD) and Optical Path Length (OPL) of a wave front. A single-beam instrument for measuring $OPD_{rms}$, a statistical measure of OPD, was described in an article by Malley, M., Sutton, G. W., and Kincheloe, N., "Beam Jitter Measurements for Turbulent Aero-Optical Path Differences," 31 Applied Optics at 4440-4443 (1992), which is incorporated by reference in its entirety herein; however, the Malley, Sutton and Kincheloe instrument required a priori information about the convective speed of the aberrating flow and provided only a statistical measure of the aberrating character of the flow.

The Malley, Sutton and Kincheloe instrument further cannot be used to determine the convection velocity of the aberrations, and the analysis of the instrument's single beam could not provide realizations of the aberrated wave fronts.

SUMMARY

In accordance with the invention, methods and systems are provided for obtaining information regarding an optical wave front that passes through a flow resulting in aberrations to the wave front. These methods and systems include one or more position sensing devices that are capable of detecting a position of a first beam and a position of a second beam. Both the first and second beams pass through the flow and the distance between the first and second beams is less than 20 times the diameter of the first beam. Further, a processor is provided that is capable of determining a displacement of the first beam and a displacement of the second beam based on the detected positions of the first and second beam, and determining information regarding the wave front based on the determined displacements.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the claimed invention.

The accompanying drawings, which are incorporated in and constitute a part of this specification, illustrate one (several) embodiment(s) of the invention and together with the description, serve to explain the principles of the invention.

BRIEF DESCRIPTION OF THE DRAWINGS

Reference will now be made in detail to the present embodiment(s) (exemplary embodiments) of the invention, an example(s) of which is (are) illustrated in the accompanying drawings. Wherever possible, the same reference numbers will be used throughout the drawings to refer to the same or like parts.

DETAILED DESCRIPTION

Figure 1:
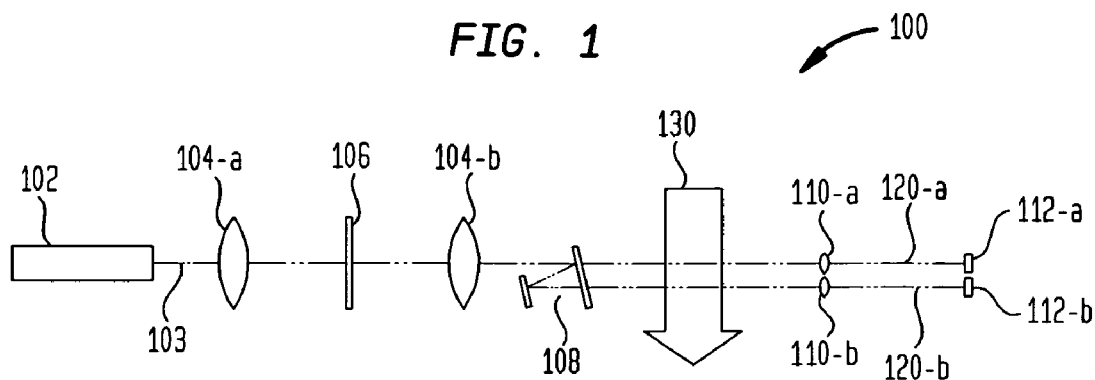
FIG. 1 illustrates a simplified diagram of a Malley probe, in accordance with methods and systems of the present invention.

FIG. 1 illustrates a simplified diagram of a Malley probe 100, in accordance with methods and systems of the present invention. As illustrated, Malley probe 100 includes a laser 102, a pair of focusing lenses 104-a and 104-b, a spatial filter 106, a beam splitter 108, a pair of beam focusing lenses 110-a and 110-b, and a pair of position sensing devices (PSDs) 112-a and 112-b. Laser 102 may be any type of laser now or later developed. In this example, laser 102 produces a laser beam 103 having an aperture of approximately 1 millimeter (mm). Focusing lens 104-a focuses laser beam 103 on the spatial filter 106, which filters out the optical noise in laser beam 103. Focusing lens 104-b likewise collimates and directs laser beam 103 on beam splitter 108. Beam splitter 108 splits laser beam 103 into two closely spaced laser beams 120-a and 120-b. In this exemplary embodiment, laser beams 120-a and 120-b are spaced between 3 and 8 mm apart and aligned, front-beam to aft-beam, in the stream wise direction. For example, in one embodiment, laser beams 102-a and 120-b are spaced 4 mm apart with each beam having a diameter of approximately 1 mm. In other examples, laser beams 120-a and 120-b may be spaced, for example, up to approximately 20 times the diameter of the beams. Further, it is also preferable that the spacing of the beams be at least greater than the diameters of the beams so that the beams do not overlap.

In this embodiment, laser beams 120-a and 120-b traverse a flow 130, such as, for example, a turbulent airflow. Further, as illustrated, laser beams 120-a and 120-b, in this example, travel in a direction that is perpendicular to the direction of flow 130. A further description of a system for generating an exemplary test flow is described below.

After traversing flow 130, laser beams 120-a and 120-b each pass through their respective beam focusing lens 110-a and 110-b. Beam focusing lenses 110 each provide a reference focal length for measuring an angle of deflection in laser beams 120 due to flow 130. The focal lengths of these lenses and their use in measuring angles of deflection are discussed in further detail below.

After passing through the applicable beam focusing lenses 110-a or 110-b, laser beams 120-a and 120-b are directed to two PSDs 112-a and 112-b. PSDs are common in the art, and one of skill in the art would understand that any type of available PSD may be used, such as, for example, a quad-cell PSD or a lateral effect detector. Further, in other examples, PSDs 112-a and 112-b may be replaced with a single PSD that is capable of detecting the positions of multiple beams (i.e., both laser beams 120-a and 120-b).

PSDs 112-a and 112-b detect the position of the respective beam 120-a and 120-b. The detected positions may then be transferred to a processor (not shown) for processing in order to obtain information regarding aberrations in the aperture through which the laser beams 120-a and 120-b are projected in order to determine the aberrations introduced by the flow 130. In one embodiment, PSDs 112-a and 112-b have an output in terms of current. In such an embodiment, this current value may be converted to a voltage that may be sampled by, for example, an analog to digital (A/D) converter, to produce a digital output of the detected position. This detected position may then be transmitted to the processor for processing. Further, the processor may be any type of computer and/or processor, such as, for example, a commercially available computer. A further description of methods and systems for processing the detected positions is provided below, including exemplary methods for using this information to calculate a convection speed for aberrations caused by the flow along with calculating an Optical Path Difference (OPD) and Optical Path Lengths (OPLs) for the wave fronts over the aperture for projecting optical signals through the flow.

Figure 2:
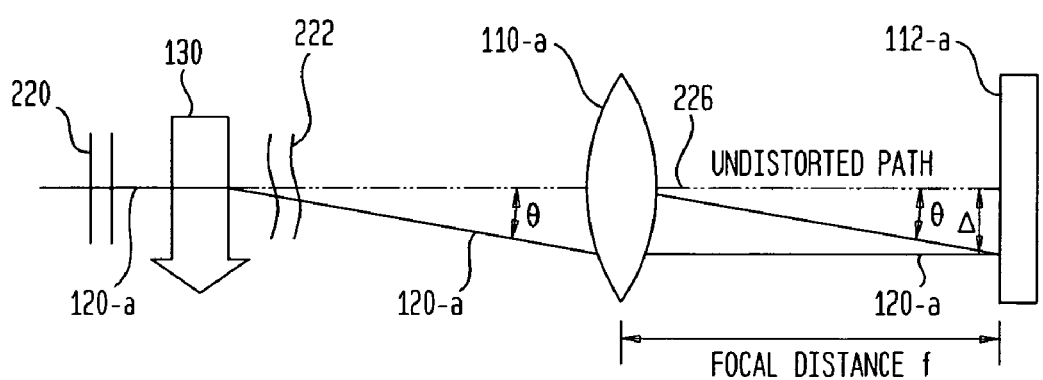
FIG. 2 illustrates one embodiment of a subsection of the Malley probe illustrated in FIG. 1, in accordance with methods and systems of the present invention.

FIG. 2 illustrates one embodiment of a subsection of Malley probe 100 illustrated in FIG. 1. Specifically, this figure illustrates flow 130, beam focusing lens 110-a, beam 120-a, and PSD 112-a of Malley probe 100. Further, as shown, the distance between beam focusing lens 110-a and PSD 112-a is set equal to the focal distance, f, of beam focusing lens 110-a, such that beam focusing lens 110-a focuses beam 120-a on PSD 112-a.

In this example, prior to entering flow 130, if a large-aperture, flat (unaberrated) wave front 220 propagates through the aberrating flow 130, its wave front 222 becomes distorted. If a Malley-Probe, small-aperture beam 120-a is projected through the flow 130, at an angle perpendicular to the large-aperture, flat wave front 220, after traversing flow 130, the probe beam 120-a emerges deflected at an angle, $\theta$, which is perpendicular to the large-aperture wave front 222 at the location of the probe beam 120-a. Further, in this example, beam 120-a will be displaced a distance $\Delta$ from its undistorted location (hereinafter referred to as undistorted path 226) after passing through the focusing lens 110-a. PSD 112-a then detects the position of beam 120-a as a function of time. From this detected position, the distance, $\Delta$, between the detected position and the undistorted path is determined. In this example PSD 112-a detects the position of beam 120-a based on the centroid of beam 120-a.

The deflection angle, $\theta$, may then be calculated as $\theta(t) = \arctan(\Delta(t)/f)$, where f is the focal length of beam focusing lens 110-a. In this example, a focal length, f of 1.0 m was used. However, in other embodiments different focal lengths may be used without departing from the invention.

Further, these calculations may, for example, be performed by a processor (not shown) connected to PSD 112-a. This processor may, for example, receive the deflection distance, $\Delta(t)$, as a function of time, and calculate the deflection angle, $\Delta(t)$, as function of time. Further, in other examples, these calculations may be performed in real time. Further, PSDs 112-a and 112-b may have a response time on the order of 20 nanoseconds or faster so that their signals have virtually no delay in their response. This allows high sampling rates and thus the ability to measure accurate correlations even with close beam spacing. Further, as discussed above, the processor may be any type of processor, such as, for example, a commercially available computer.

Figure 3:
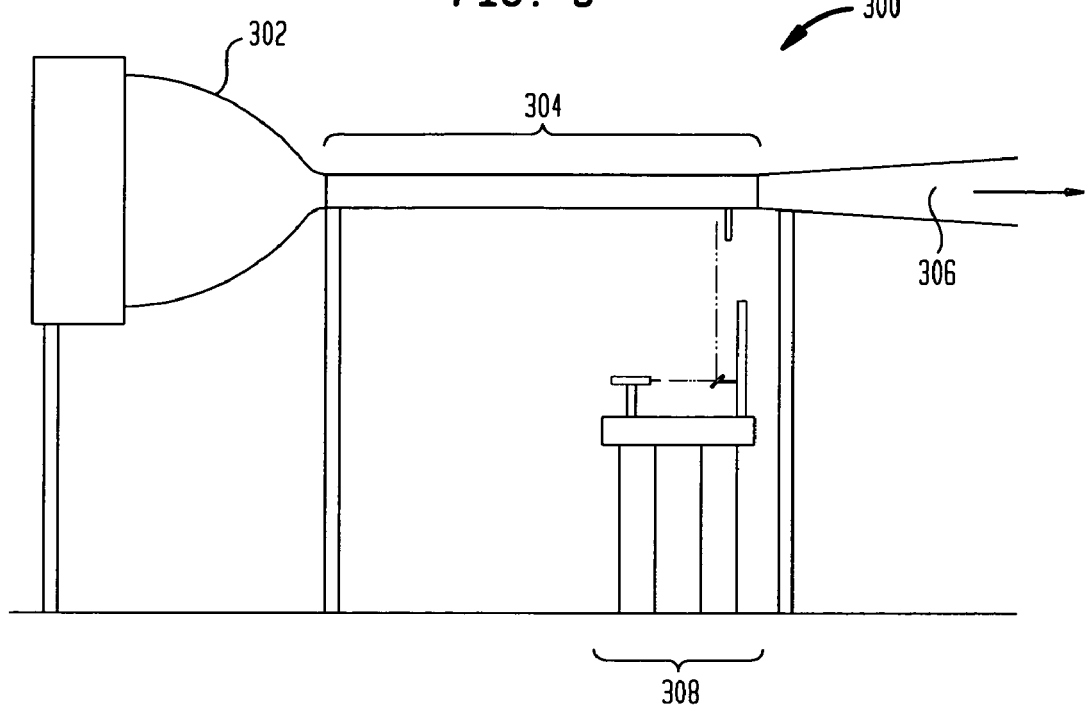
FIG. 3 is a schematic diagram of an exemplary test system in which a Malley probe may be utilized, in accordance with methods and systems of the present invention.

FIG. 3 is a schematic diagram of an exemplary test system 300 in which the Malley probe 100 of FIG. 1 may be utilized. Test system 300 may be utilized to, for example, generate a turbulent boundary layer and measure the effects of the boundary layer on an optical wave front. Once these effects are determined, this information may be utilized, for example, to correct for errors caused by these aberrations as one of skill in the art would readily appreciate.

As shown, test system 300 may include an air inlet 302, a test section 304, and a diffuser 306. In this system, air inlet 302 may be, for example, a 150:1 contraction inlet. Further, diffuser 306 may be joined to a large plenum (e.g., a grated plenum) (not shown). The plenum may be pumped to a low pressure by vacuum pumps, such as, for example, three Allis Chalmer 3,310 CFM vacuum pumps. Further, in an example employing three vacuum pumps, the plenum may be pumped by one, two, or three pumps to generate a desired Mach number in the flow, such as for example a Mach Number between M=0.3 and 0.95.

In the embodiment of FIG. 3, test section 304 may have a cross section of 9.9×10.1 cm and is capable of being lengthened or shortened to adjust the thickness of the boundary layer. In addition, the lower side of test section 304 (e.g., the side of the tunnel whose boundary layer is being investigated) may include one or more objects to facilitate generating the initial growth of a turbulent boundary layer. For example, in one embodiment, medium grain sandpaper along the first 50 cm of test section 304 is included. Further, the boundary layer, in this example, is allowed to grow naturally from that point to a tunnel length of between 60 to 110 cm. The flow then enters a measurement portion 308 of test section 304.

Figure 4:
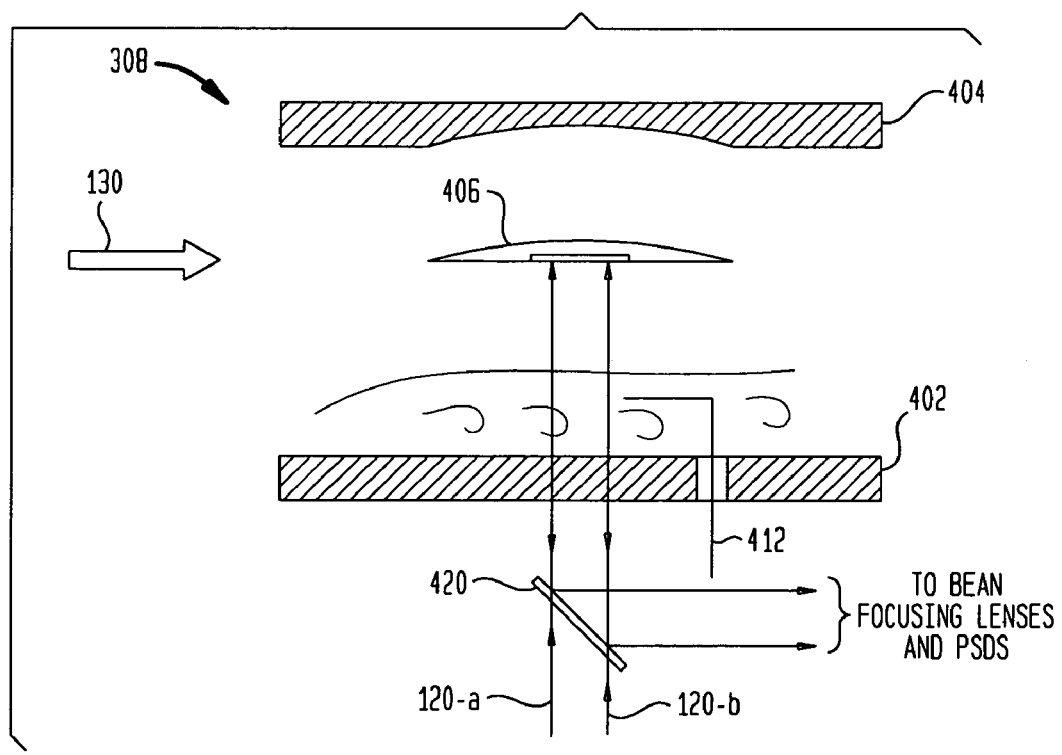
FIG. 4 illustrates an exemplary measurement section of a test section, in accordance with methods and systems of the present invention.

FIG. 4 illustrates measurement section 308 of a test section 304, such as described with reference to FIG. 3. As illustrated, measurement section 308 includes a bottom wall 402 and a top wall 404, a mirror mounted on a mounting plate 406, and a hot wire 412. The measurement section walls 402 and 404, in this example, were made of Plexiglas to permit laser beams 120-a and 120-b of Malley probe 100 to enter and exit measurement section 308. Although in this example Plexiglas was used, in other examples, other substances capable of allowing passage of a laser beam may be used.

The mirror on mounting plate 406, in the illustrative example, includes a first-surface mirrored optical flat that is mounted at the mid-height of measurement section 308 on the mounting plate. The mounting plate is preferably shaped to minimize any separated flow over the mirror. Further, in this example, the upper wall 404 of measurement section 308 is contoured to compensate for any blockage effect of mirror and mounting plate 406. Mirror is used in this example to eliminate complications that may be present due to propagation of the laser beam through both the lower wall 402 and the upper wall 404. Also, by reflecting the measurement beams 120-a and 120-b directly back along their propagation path through the same boundary layer at the same location, the optical path through the bottom boundary layer of the beams 120-a and 120-b is double, thus increasing the measurement signal-to-nose ratio.

In this example, laser beams 120-a and 120-b pass through a 50/50 beam splitter 420, then through lower wall 402, and into the turbulent boundary layer of flow 130. Laser beams 120-a and 120-b are then reflected by mirror 406 back through the turbulent boundary layer of flow 130 and through lower wall 402. Laser beams 120-a and 120-b are then reflected by 50/50 beam splitter 420 towards beam focusing lenses 110-a and 110-b and PSDs 112-a and 112-b, respectively.

Measurement section 308 may also include a hot wire 412. In one embodiment, a single hot-wire is used with a commercial constant temperature anemometer with a built-in low-pass filter. Hot wire 412, as one of ordinary skill in the art would appreciate may be any type of conventional hot-wire for taking conventional hot-wire measurements to obtain boundary layer profiles. Further, in this example the sampling rate for the hot wire measurements is 60 kHz, with a low-pass frequency cut-off value of 30 kHz. Further, in this example, hot wire 412 is placed inside measurement section 308 on a traverse system (not shown) just behind the optical measurement location and the hot wire is calibrated at the range of Mach numbers being tested (e.g., M=0.2 to 0.6). Hot wire 412 may be used in this example to determine boundary layer profiles (e.g., U(y) and $u_{rms}(y)$) for different test section lengths at different Mach numbers.

As mentioned above, two-beam Malley probe 100 may be used to measure the convection speed of aberrations in a wave front caused by the flow. The following provides a more detailed description of two exemplary methods for calculating this aberration convection velocity. These methods are referred to herein as the cross-correlation method and the spectral method.

The following provides a description of the cross-correlation method. Pursuant to this exemplary method, the aberration convection velocity is calculated by first computing a time-delayed correlation function:

$$R(\tau) = \overline{\theta_1(t)\theta_2(t-\tau)}$$

between two deflection angles $\theta_1(t)$ and $\theta_2(t)$ for the two probe beams 120-a and 120-b. The convection speed, $U_c$, for the aberrations may then be computed by knowing the separation, s, between beams 120-a and 120-b and a time delay of the highest correlation, $\tau_{max}$, where $R(\tau^{max})$=max (i.e, where $R(\tau)$ reaches its maximum value). The separation, s, is the separation of beams 120-a and 120-b prior to any aberrations and s, in this example, is the separation of the beams along the direction as flow 130, where beams 120-a and 120-b are perpendicular to flow 130. Thus, the convection velocity, $U_c$, may be calculated as $$U_c = s/\tau_{max}.$$

The following provides a description of the spectral method for computing the convection velocity. In this example, the time delay may be computed by analyzing a spectral cross-correlation function:

$$S(\omega) = \frac{1}{T}\langle\hat{\theta}_1(\omega)\hat{\theta}_2^*(\omega)\rangle$$

where the hat denotes a Fourier transform, the asterisk denotes a complex conjugate, T is a block sampling time, and the brackets denote an ensemble average. Assuming a non-changing convecting structure without any noise, the signal downstream, $\theta_2$, is a time-delayed signal of the upstream signal, $\theta_1$, $$\theta_2(t) = \theta_1(t-\tau^{max})$$

The Fourier transform of $\theta_2$ becomes $$\hat{\theta}_2(t) = \int\theta_2(t)\exp(-i\omega t)dt = \int\theta_1(t-\tau^{max})\exp(-i\omega[t-\tau^{max}])\exp(-i\omega\tau^{max})dt = \hat{\theta}_1(\omega)\exp(-i\omega\tau^{max})$$

Using this relation, the spectral correlation $S(\omega)$ is computer as follows, $$S(\omega) = \frac{1}{T}\langle\hat{\theta}_1(\omega)\hat{\theta}_2^*(\omega)\rangle = \frac{1}{T}\langle\hat{\theta}_1(\omega)[\hat{\theta}_1(\omega)\exp(-i\omega\tau^{max})]^*\rangle = A(\omega)\exp(-i\omega\tau^{max})$$

where $$A(\omega) = \frac{1}{T}\langle \hat{\theta}_1^*(\omega)\hat{\theta}_1(\omega)\rangle$$

is a real function of ω. Thus, by analyzing the argument of the spectral cross-correlation function, S(ω), one can find the time delay by a least-square estimation, $|\exp(-i\text{Arg}[S(\omega)])-i\omega\tau^{max})|^2 \rightarrow \min$ This spectral method may be preferable when low-frequency noise is present in the signal. Such low frequency noise may result from tunnel or platform vibrations that may be caused by, for example, Malley probe 100 being on a vehicle, such as an airborne platform. Tunnel vibrations may result in vibrations of the measurement equipment (i.e., the focusing lenses, PSDs, etc.) that may introduce low-frequency noise into the signal. Additionally, the Fourier transforms discussed above may be computed using any conventional approach, such as, for example, by using a Fast Fourier Transform (FFT).

As discussed above, Malley Probe 100 is an optical instrument that can make direct, accurate measurements of dynamically distorting wave front, including the character of the wave front's Optical Path Length (OPL) and Optical Path Difference (OPD). The following provides a more detailed description of exemplary methods for determining the OPL and OPD for the aberrated wave front.

As discussed above, PSDs 112-a and 112-b measure the locations of beams 120-a and 120-b, respectively, as a function of time. From these detected beam deflections, Δ(t), the deflection angle, θ(t), may be calculated as θ(t)=arctan (Δ(t)/f), where f is the focal length of beam focusing lens 110-a.

According to Huygens' principle, beams 120-a and 120-b will emerge from the aberrating flow normal to the wave front of a larger-aperture laser projected through the same flow field. Thus, the deflection angle of one of the small-aperture beams (i.e., beam 120-a and 120-b) is the negative of the spatial gradient of the wave front at the probe-beam location, θ(x, y, t)=−grad OPL(x, y, t). This may also be expressed for the stream wise direction, x, as:

$$\theta(x, y, t) = -\left(\frac{OPL(x, y, t)}{dx}\right)$$

As discussed above, Malley probe 100 may be used to extract the convection velocity, $U_c$, of flow 130 (which may also be referred to as an optically aberrating structure). The convection velocity, $U_c$, may be calculated by, for example, either the above-described cross-correlation or spectral methods. The deflection angle, θ(t), of a probe beam (120-a or 120-b) is the spatial derivative of the wave front. The convection velocity, $U_c$, may then be used to unfold the OPL using the fact that the aberrations "convect" with the fluid structures (dx/dt=$U_c$)

$$OPL(x_0, t)\int_{i_0}^{i}\left(\frac{dOPL}{dx}\right)_{x_0}\left(\frac{dx}{dt}\right)dt = \int_{i_0}^{i}[-\theta(t)]U_c dt$$

After OPL($x_0$,t) is calculated at the single probe location, $x_0$, a Taylor's frozen flow hypothesis can be made to project OPL upstream and downstream by trading time and position as, $OPL(x_i,t)=OPL(x_0 \mp U_c\Delta\tau_i,t)$ where, $$\Delta t_i = \frac{|x_i - x_0|}{U_c},$$

and "i" is for the upstream construction and the "+" for the downstream construction (i.e., upstream wave front information has not arrived at the probe location by time, t). Taylor's frozen flow hypothesis is common knowledge to one of ordinary skill in the art.

The OPL may then be used to determine the OPD, $OPD(x,t)=OPL(x,t)-\overline{OPL(x,t)}$ In one embodiment, Malley probe 100 may be adapted in order to use sub-apertures of an incoming large-aperture wave front. In such an example, a modified Malley probe may be used that receives an incoming wave front. Mirrors or other devices then split this received wave front into smaller, closely-spaced beams. These closely-spaced beams are then analyzed by the Malley probe in the same manner as in the 2-beam Malley probe described above. This system may be used, for example, as a measurement tool for a direct characterization of optical aberrations and/or as a sensor in adaptive optics systems designed to compensate for the effects of flow disturbances. As such, such a system may be useful in laser weapon systems, astronomy and laser communications systems that propagate laser beams through the atmosphere. Additionally, such a system may also be useable in laboratory equipment for combustion, chemically reacting flows, as well as high temperature and high-speed flows.

Figure 5:
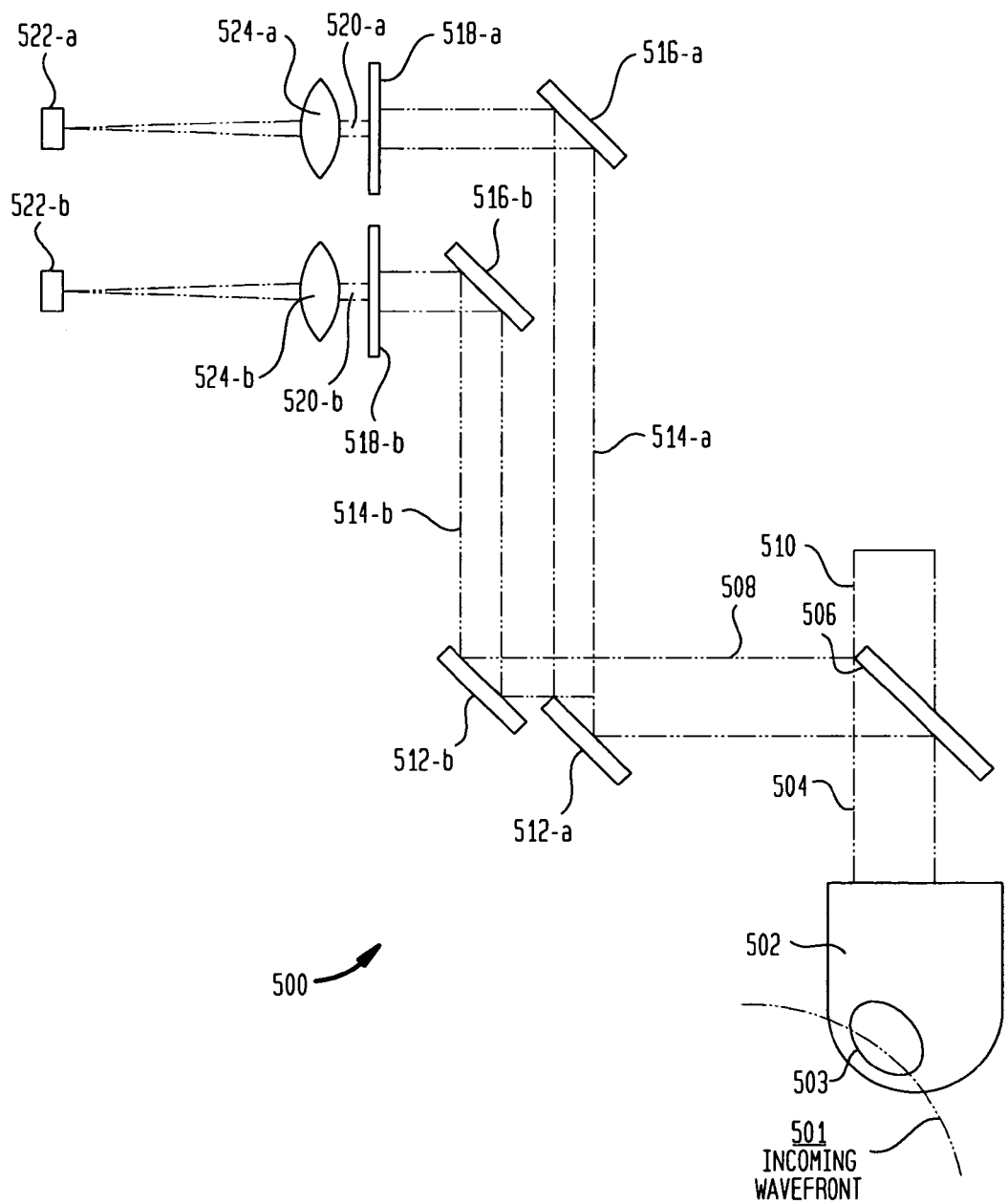
FIG. 5 illustrates an exemplary embodiment of a Malley probe that receives a larger aperture wave front and splits the wave front into two smaller sub-apertures, in accordance with methods and systems of the present invention.

FIG. 5 illustrates an exemplary embodiment of a Malley probe that receives a larger aperture wave front and splits the wave front into two smaller sub-apertures. As illustrated, Malley probe 500 is connected to a beam director 502. Beam director 502 may be attached to an airborne platform, such as, for example, an airplane. Beam director 502 receives an incoming optical signal 501 via an entrance pupil 503 producing an optical beam 504. A beam splitter 506 then splits beam 504 into two-beams. The two-beams include a beam 508 that will be processed by Malley probe 500 and a beam 510 that will be processed for traditional purposes, such as, for example, to retrieve information transmitted via beam 504.

Two mirrors 512-a and 512-b split beam 508 into two smaller aperture beams, which will be referred to as sub-aperture beam 514-a and sub-aperture beam 514-b. These two beams 514-a and 514-b are then reflected by mirrors 516-a and 516-b, respectively. Although, this exemplary embodiment redirects these beams, in other embodiments mirrors 516-a and 516-b need not be used, or additional mirror(s) may be used for altering the direction/path of beams 516-a and 516-b.

A sub-aperture iris, 518-a and 518-b, then clips a portion of sub-aperture beams 514-a and 514-b, respectively, to produce beams 520-a and beam 520-b, to a diameter which depends on the size of the original entrance pupil 503, which in this exemplary application could be between 1 mm and 10 cm, and the spacing between the beams is 1-20 times their beam diameters, such as was the case with the above-described Malley probe 100 of FIG. 1. The combination of mirrors 512 and 516 along with sub-aperture irises 518 will be collectively referred to as an optical narrowing mechanism. Although this embodiment illustrates one example of an optical narrowing mechanism, other mechanisms for obtaining smaller diameter beams from a larger aperture wave front may be used without departing from the invention.

Beam 520-*a* and beam 520-*b* then pass through a beam focusing lens (524-*a* and 524-*b*, respectively) that focuses the beam (520-*a* and 520-*b*) on its respective PSD (522-*a* and 522-*b*). Beams 520-*a* and 520-*b* may then be processed in the same manner as discussed above with reference to FIGS. 1-4, in order to obtain information regarding the convection velocity of the aberrations introduced into the wave front of beam 504 along with OPL and OPD information for the wave front. This information may then be used in processing beam 510 in order to, for example, correct for errors introduced by the aberrations. For example, these aberrations may be corrected for or their effects minimized by adding a proper conjugate wavefront using, for example, a fast deformable mirror. Further, in other embodiments, Malley probe 500 may utilize three beams, where the beams are designed such that they form an angle. These three beams, may be useful in determining the direction of a flow when its direction is unknown. For example, methods such as described above may be used in conjunction with triangulation techniques to obtain information regarding the direction of the flow, and using this information the convection velocity for the flow along with OPD and OPL information for the optical signal may be determined.

Further, although FIG. 5 was discussed with reference to creating two smaller-aperture beams from an incoming larger aperture beam, in other examples, three or more beams may be used without departing from the invention.

In yet another embodiment, a Malley probe, such as described above, may be used as an atmospheric turbulence reconstructor. Such a system, may utilize a multi-beam Malley probe to measure aberrations in a wave front of a signal being transmitted over land for a distance of, for example, 100s of meters and up. Such a system may be used, for example, to create a model of the aberrations that a transmission signal(s), such as, for example, a laser beam for free space communications, may undergo while traveling along its transmission path. This transmission path may traverse 100 s of meters over which the transmission signal (e.g., a communications laser beam(s)) may be subject to multiple turbulent flows. For example, the transmission path may go above or around buildings, cliffs, or other structures that subject the transmission signal(s) to various turbulent flows.

In an exemplary atmospheric turbulence reconstruction system, a plurality of beams are propagated along the transmission path of the transmission signal and measurements are taken for the beams at various points along the path. These measurements may then be used to account for atmospheric turbulence along the transmission path by, for example, making corrections on the front end of the transmission signal. For example, the measurements may be used to create a model of the aberrations introduced along the transmission path. This model may then be used on the front end to correct for these aberrations prior to transmission of the transmission signal.

Figure 6:
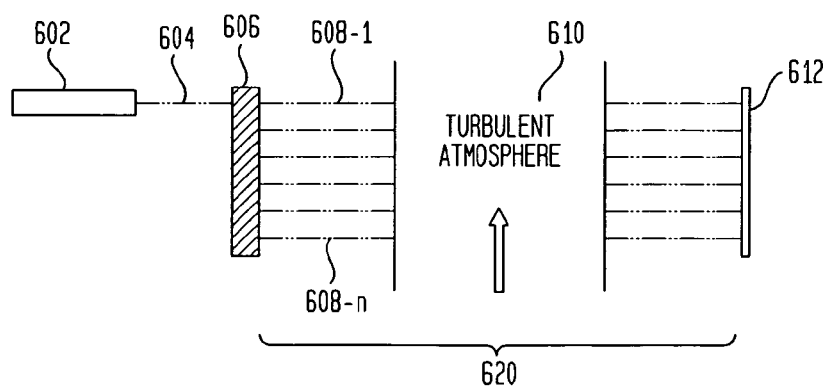
FIG. 6 illustrates a simplified diagram of a modified Malley probe for use in measuring atmospheric turbulence, in accordance with methods and systems of the present invention.

FIG. 6 illustrates a simplified diagram of a modified Malley probe for use in measuring atmospheric turbulence. As illustrated, a laser 602 may generate a laser beam 604. A beam splitter 606 may then split laser beam 604 into a plurality of laser beams 608-1 thru 608-*n*. These laser beams, 608-1 thru 608-*n*, may then be transmitted across a transmission path 620 where they are subject to a turbulent atmospheric flow 610. Laser beams, 608-1 thru 608-*n*, may then be focused by a beam focusing lens (e.g., having a focal length of 1 m) (not shown) on one or more PSDs 612. For simplicity, the focusing lenses, etc., discussed with reference to FIG. 1 and are not illustrated. The positions of these various beams may then be detected as a function of time, and this information used to determine a convection velocity for the turbulent flow along with information regarding the OPL and OPD for the wave front.

Further, in this example, the plurality of laser beams, 608-1 thru 608-*n*, may be arranged in a pattern simulating a larger aperture beam (e.g., 10-30 cm). This larger aperture is preferably approximately the same size as the aperture of the transmission signal, which in this example is assumed to be between 10 and 30 cm.

Figure 7A:
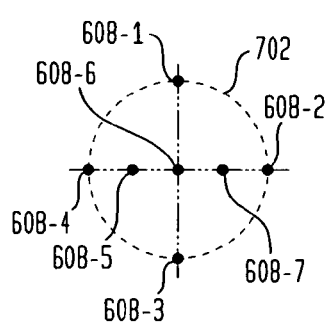
FIG. 7 illustrates exemplary patterns for the plurality of laser beams over this larger aperture, in accordance with methods and systems of the present invention.
Figure 7B:
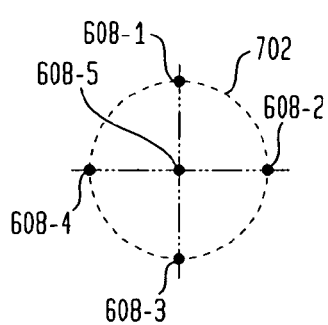
Figure 7C:
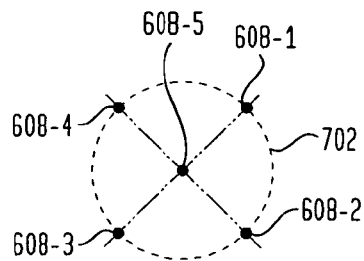

FIG. 7 illustrates exemplary patterns for the plurality of laser beams over this larger aperture. For example, FIG. 7A illustrates a pattern employing 7 beams, 608-1 thru 608-7 within the area of larger aperture beam 702. FIG. 7B and FIG. 7C illustrate respective patterns employing 5 beams, 608-1 thru 608-5.

Further, in addition to detecting the position of the beams at the end of the transmission path, measurements may also be taken at other points along the path, by for example, splitting off a portion of beams, 608-1 thru 608-*n*, using a beam splitter, and sending the split of beam to a modified Malley probe, such as discussed above. Taking measurements at various points along the transmission path may help to give a fuller understanding of the flow the wave fronts are subject to, which may aid in accounting for/correcting errors introduced by these aberrations. Moreover, the sites along the transmission path selected for taking these measurements may be selected such that they take measurements in areas know to have higher turbulent flows (e.g., when the beam is passing over/around a particular structure). Also, in an example, air temperatures along the transmission path may also be recorded and taken into account when modeling aberrations introduced into the wave front of the communications beam.

Although the above embodiment was described with reference to the far-field pattern of laser beams of aperture dimensions ranging from 10 to 30 cm, which are made to propagate through a turbulent aberrating intervening air medium, in other examples, the system may be applied to other systems. For example, similar system may be applied to other free space communications system or, for example, directed energy laser weapons. Additionally, in laser weapon application a guide star and/or target designation concepts may also be employed. Such guide stars and target designation concepts are known to one of ordinary skill in the art.

Figure 8:
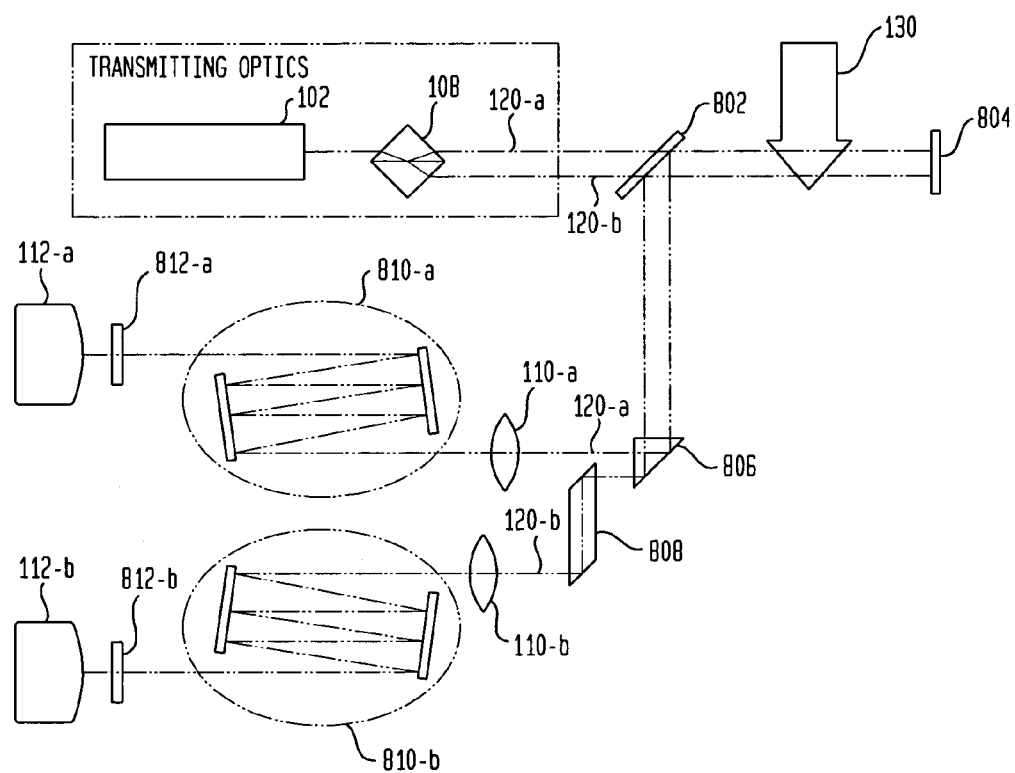
FIG. 8 illustrates a compact Malley probe, in accordance with methods and systems consistent with the invention, in accordance with methods and systems of the present invention.

FIG. 8 illustrates a compact Malley probe, in accordance with methods and systems consistent with the invention. As with the Malley probe of FIG. 1, this exemplary system includes a laser 102, a beam splitter 108, a flow 130, beam focusing lenses 110-*a* and 110-*b* and position sensing devices 112-*a* and 112-*b*. Although not illustrated in this figure, such an exemplary system may include other devices, such as, for example, a spatial filter, along with other focusing lenses for initial beam conditioning. Further, as with Malley probe of FIG. 1, this equipment may include commonly available focusing lenses and beam splitters, such as, for example, cube-type and plate type beam splitters. Further, as with the Malley probe 100 of FIG. 1, beams 120-*a* and 120-*b* each have a diameter of approximately 1 mm and are closely spaced.

As illustrated, beam 120-*a* and 120-*b* pass through a beam splitter 802, which may be, for example, a plate type beam splitter. Beams 120-*a* and 120-*b* then pass through flow 130 and are then redirected by a beam-redirecting mirror 804. Beams 120-*a* and 120-*b* then pass back through flow 130 and are then redirected by beam splitter 802.

Beam 120-*a* and 120-*b* then are redirected by right prism. Beam 120-*b* then passes through a rhombus prism 808 that moves beam 120-*b* further away from beam 120-*a* in order to send them through separate lens 110-*a* and lens 110-*b*. Although in this example, a right prism 806 and a rhombus prism 808 were used, in other examples, other types of similar equipment may be used, such as, for example, first-surface mirrors. Further, although in this example, only beam 120-*b* was moved, in other examples, beam 120-*a* may be moved instead, both beams (120-*a* and 120-*b*) may be moved, or neither beam may be moved.

Beams 120-*a* and 120-*b* then respectively pass through their respective beam focusing lens (110-*a* and 110-*b*). In this example beam focusing lenses 110-*a* and 110-*b* may have a focal length of, for example, 1 m. Beam 120-*a* and 120-*b* are then reflected back and forth a number of times between a respective mirror system 810-*a* and 810-*b*. This serves to allow beams 120-*a* and 120-*b* to traverse a larger optical path in a smaller area.

Beams 120-*a* and 120-*b* then pass through a filter (812-*a* and 812-*b*) that reduces the intensity of the respective beam in order to prevent saturation of the PSD. Although in this example filters are used, in other examples, they need not be used and their use may be determined based on the intensity of the beams or by, for example, notch filtering to eliminate ambient light or background light that might find its way to this point in the optical train. Moreover, the other discussed Malley probes, such as Malley probe 100 of FIG. 1, may also utilize such filters.

After passing through the filter (812-*a* and 812-*b*), the beams (120-*a* and 120-*b*) are detected by PSDs 112-*a* and 112-*b*, respectively. The positions of these beams may then be processed as described above to obtain information regarding the convection velocity of aberrations in the wave front along with OPD and OPL information for the wave fronts.

In the above-exemplary compact Malley probe, both the transmission and receiving optical equipment of the Malley probe is mounted on a single plate and the laser beam is reflected back through the flow by mirror 804. This single plate, for example, may be a 29 cm×29 cm support plate. However, in other examples, the transmission equipment (e.g., laser 102 and beam splitter 108) may be mounted on one support plate and the receiving optics mounted on a separate support plate. This arrangement may be convenient for situations where the flow field to be measured is relatively large in size or not convenient for placing return mirror 804.

Additionally, in the above example, laser 102 may be any type of laser, such as, for example an He—Ne laser with separate beam collimation and attenuation optics, or, for example, a battery-operated semi-conductor laser with integrated collimation and intensity controls.

Additionally, as mentioned above, a Malley probe may be utilized on an airborne platform to model the aberrations introduced into a wave front of an optical signal propagating through the atmosphere. Such an optical signal may be for example, a signal for free-space communications or a laser weapons system. This model may then be used to estimate the effectiveness of the optical system and possibly to correct for aberrations in the optical signal due to the atmosphere.

Figure 9:
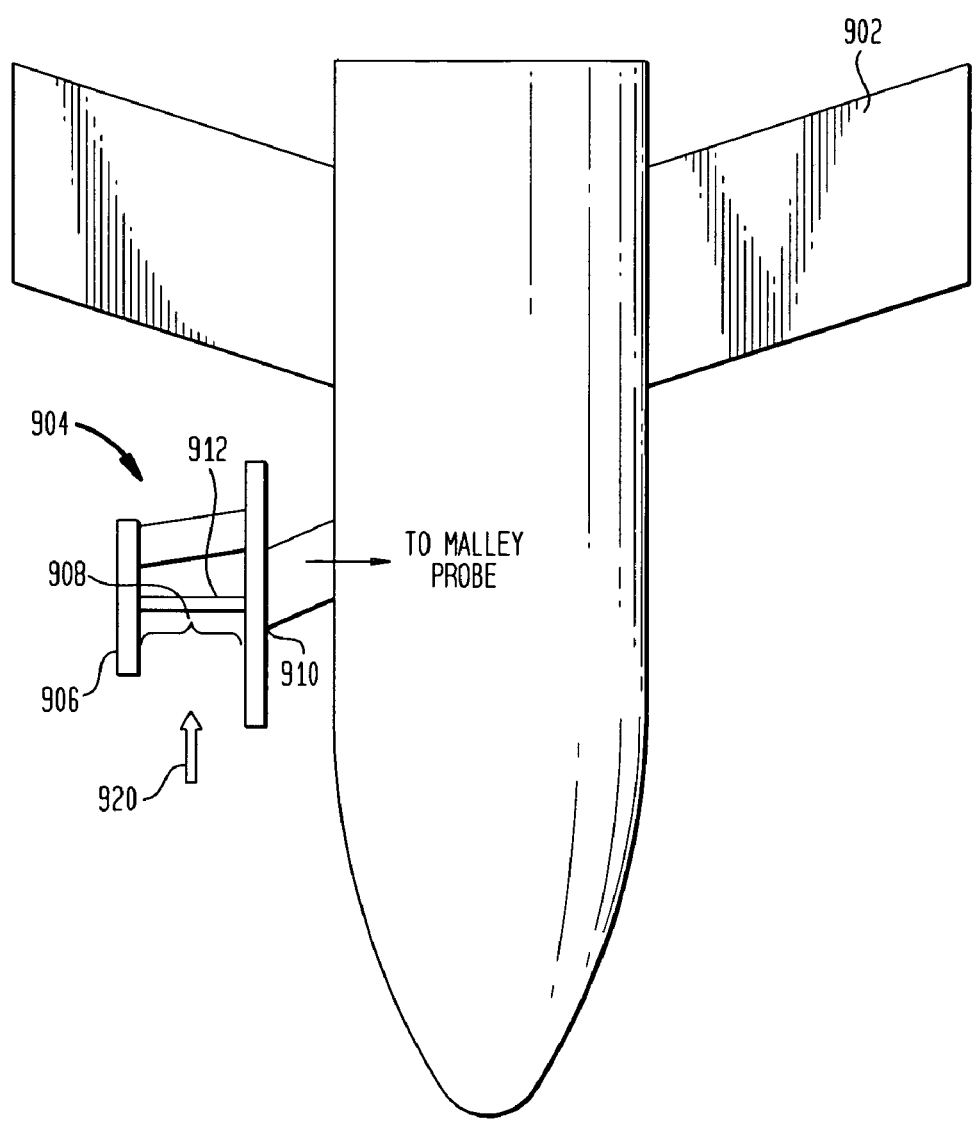
FIG. 9 illustrates an exemplary embodiment where a Malley probe is mounted on an airborne platform, in accordance with methods and systems of the present invention.

FIG. 9 illustrates an exemplary embodiment where a Malley probe is mounted on an airborne platform 902. As illustrated, an airborne platform 902 may include a test section 904. This test section 904 may include a reflector 906 (e.g., a mirror), a region for allowing a portion of the atmosphere, through which the airborne platform 902 is flying, to create a flow 920 to pass through test region 904 at region 908, and a test section wall 910 on the airborne platform 902. The test section wall 910 may include a window made of any suitable material permitting a laser beam 912 to pass through. In this system, two or more laser beams 912 are transmitted through wall 910, through flow 920, redirected by reflector 906, back through flow 920 and then back through wall 910. Laser beams 912 may then be analyzed by a Malley probe, such as described above to obtain information regarding aberrations introduced into the wave fronts of the beams, including OPL and OPD information.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for obtaining information regarding an optical wave front that passes through a flow resulting in aberrations to the wave front, comprising:
   one or more position sensing devices, the one or more position sensing devices capable of detecting a position of a first beam and detecting a position of a second beam; wherein the first and second beams pass through the flow and the distance between the first and second beams is less than 20 times the diameter of the first beam; and
   a processor capable of determining a displacement of the first beam and a displacement of the second beam based on the detected positions of the first and second beam, and determining information regarding the wave front based on the determined displacements.

2. The system of claim 1 further comprising:
   a first lens constructed and arranged to refract the first beam;
   a second lens constructed and arranged to refract the second beam; and
   wherein the processor uses the focal length of at least the first lens to determine the information regarding the wave front.

3. The system of claim 1, wherein the processor is further capable of determining a velocity for the flow based on the detected positions of the first and second beams.

4. The system of claim 3, wherein the processor is further capable of determining the velocity for the flow by calculating a Fourier transform of an angle of deflection for the first beam and by calculating a Fourier transform of an angle of deflection for the second beam; wherein the angles of deflection are determined from the detected displacements of the first beam and the second beam, respectively.

5. The system of claim 1, further comprising a plurality of mirrors constructed to reflect the first beam a plurality of times in order to lengthen an optical path for the beam.

6. The system of claim 1, further comprising:
a beam director capable of receiving an optical signal having an aperture; and
a first optical narrowing mechanism operable on the optical signal for obtaining a first beam from the optical signal, wherein the first beam has an aperture smaller than the aperture of the optical signal;
a second optical narrowing mechanism operable on the optical signal for obtaining a second beam from the optical signal, wherein the second beam has an aperture smaller than the aperture of the optical signal.

7. The system of claim 1, wherein the system is mounted on an airborne platform.

8. The system of claim 1, wherein the first beam and the second beam each traverse an optical path passing through one or more turbulent flows resulting from air flow passing around a structure.

9. The system of claim 8, wherein the structure is a manmade object.

10. The system of claim 9, wherein the structure is a building.

11. The system of claim 10, wherein the structure is a natural object.

12. The system of claim 11, wherein the structure is a cliff.

13. The system of claim 1, wherein the information regarding the wave front is for use in correcting for aberrations in an optical signal.

14. A system for obtaining information regarding an optical wave front that passes through a flow resulting in aberrations to the wave front, comprising:
one or more lenses constructed and arranged to refract at least two beams, wherein the beams pass through a flow;
one or more position sensing devices, the one or more position sensing devices configured to detect a time history of positions of the beams; and
a processor capable of determining displacements of the beams based on the detected position for the beams, and determining information regarding the wave front based on the determined displacement and the focal length of the lenses.

15. The system of claim 14, wherein the at least two beams includes a first beam and a second beam, and wherein the distance between the first and second beams is less than 20 times the diameter of the first beam.

16. A system for obtaining information regarding an optical wave front that passes through a flow resulting in aberrations to the wave front, comprising:
one or more position sensing devices, the one or more position sensing devices capable of detecting a position of a first beam and detecting a position of a second beam; wherein the first and second beams pass through the flow; and
a processor capable of determining a displacement of the first beam and a displacement of the second beam based on the determined positions for the first and second beam, determining the angles of deflection for the beams based on the detected displacement of the beams, determining a velocity for the flow based on the detected positions of the first and second beams by taking the Fourier transforms of the angles of deflection for the first and second beams, and determining information regarding the wave front based on the determined displacements and the determined velocity.

17. The system of claim 16, wherein the distance between the first and second beams is less than 20 times the diameter of the first beam.

18. A system for obtaining information regarding an optical wave front that passes through a flow resulting in aberrations to the wave front, comprising:
a plurality of mirrors configured and arranged to reflect two beams a plurality of times in order to lengthen an optical path for the beams;
one or more position sensing devices, the one or more position sensing devices capable of detecting a position of the first beam and detecting a position of a second optical beam; wherein the first and second optical beams pass through the flow; and
a processor capable of determining a displacement of the first beam and a displacement of the second beam based on the determined positions for the first and second beam, and determining information regarding the wave front based on the determined displacements.

19. The system of claim 18, wherein the distance between the first and second beams is less than 20 times the diameter of the first beam.

20. A system for obtaining information regarding an optical wave front that passes through a flow resulting in aberrations to the wave front, comprising:
a beam director capable of receiving an optical signal having an aperture;
a first optical narrowing mechanism operable on the optical signal for obtaining a first beam from the optical signal, wherein the first beam has an aperture smaller than the aperture of the optical signal;
a second optical narrowing mechanism operable on the optical signal for obtaining a second beam from the optical signal, wherein the second beam has an aperture smaller than the aperture of the optical signal;
one or more position sensing devices, the position sensing devices capable of detecting a position of the first and the second beams; and
a processor capable of determining a displacement of the first and the second beams based on the determined positions for the first and the second beams, and determining information regarding the wave front based on the determined displacements.

21. The system of claim 20, wherein at least one of the optical narrowing mechanisms includes a reflector for obtaining a sub-aperture of the optical signal.

22. The system of claim 21, wherein at least one of the optical narrowing mechanisms includes an iris for obtaining the first and the second beams.

23. The system of claim 20, wherein the distance between the first and second beams is less than 20 times the diameter of the first beam.

24. A system for obtaining information regarding an optical wave front that passes through a flow resulting in aberrations to the wave front, comprising:
a set of one or more position sensing devices, the one or more position sensing devices capable of detecting a position of the first and the second beams; and
a processor capable of determining a displacements of the first and the second beams based on the detected position of the first and the second beams, and determining information regarding the wave front based on the determined displacements; and
wherein the system is mounted on an airborne platform.

25. The system of claim 24, wherein the set of position sensing devices are further capable of detecting a position for the first beam and a second beam and the distance between the first and second beams is less than 20 times the diameter of the first beam.

26. A system for obtaining information regarding an optical wave front that passes through a flow resulting in aberrations to the wave front, comprising:
- multiple position sensing devices, the multiple position sensing devices capable of detecting a position of the multiple beams, wherein the beams traverse an optical path passing through one or more turbulent flows resulting from air flow passing around a structure; and
- a processor capable of determining the displacements of the multiple beams based on the determined positions for the multiple beams, and determining information regarding the wave front based on the determined displacements.

27. The system of claim 26, wherein the structure is a manmade object.

28. The system of claim 27, wherein the structure is a building.

29. The system of claim 26, wherein the structure is a natural object.

30. The system of claim 29, wherein the structure is a cliff.

31. The system of claim 26 wherein the set of position sensing devices are further capable of detecting the positions for the multiple beams; and wherein the separations between the multiple beams are less than 20 times the diameter of the first beam.

32. A method for obtaining information regarding an optical wave front that passes through a flow resulting in aberrations to the wave front, comprising:
- detecting a position of a first beam, wherein the first beam passes through the flow;
- detecting a position of a second beam, wherein the second beam passes through the flow; wherein the distance between the first and second beams is less than 20 times the diameter of the first beam; and
- determining a displacement of the first beam based on the detected position of the first beam;
- determining a displacement of the second beam based on the detected position of the second beam; and
- correcting a source of the optical wave front based on the determined displacements.

33. A system for obtaining information regarding an optical wave front that passes through a flow resulting in aberrations to the wave front, comprising:
- means for detecting a position of a first beam, wherein the first beam passes through the flow;
- means for detecting a position of a second beam, wherein the second beam passes through the flow; wherein the distance between the first and second beams is less than 20 times the diameter of the first beam; and
- means for determining a displacement of the first beam based on the detected position of the first beam;
- means for determining a displacement of the second beam based on the detected position of the second beam; and
- means for determining information regarding the wave front based on the determined displacements.

* * * * *